A. M. SEELEY & A. HUETHER.
AUTOMATIC TUBE CUTTING MACHINE.
APPLICATION FILED AUG. 10, 1910.
1,085,946.
Patented Feb. 3, 1914.
17 SHEETS—SHEET 4.
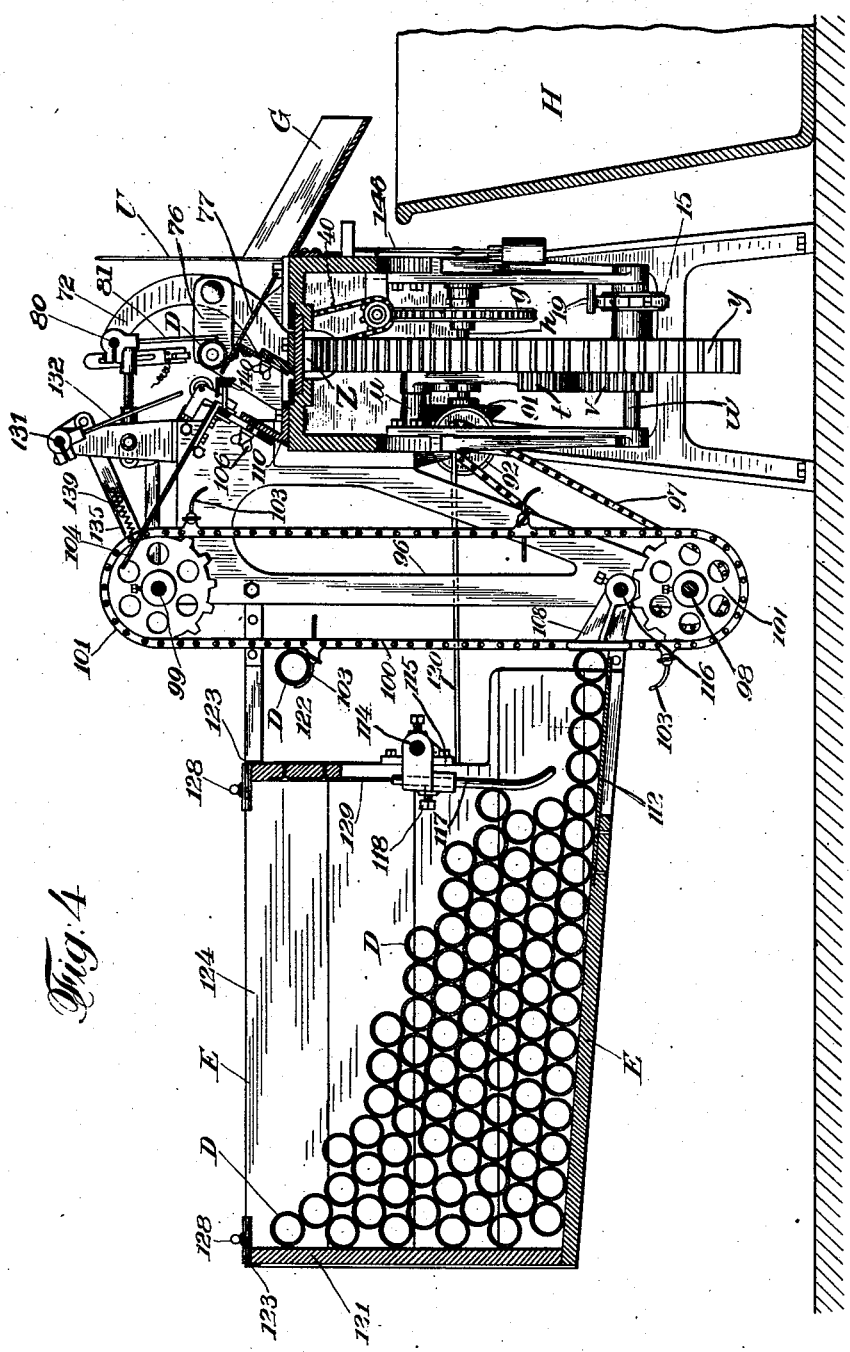

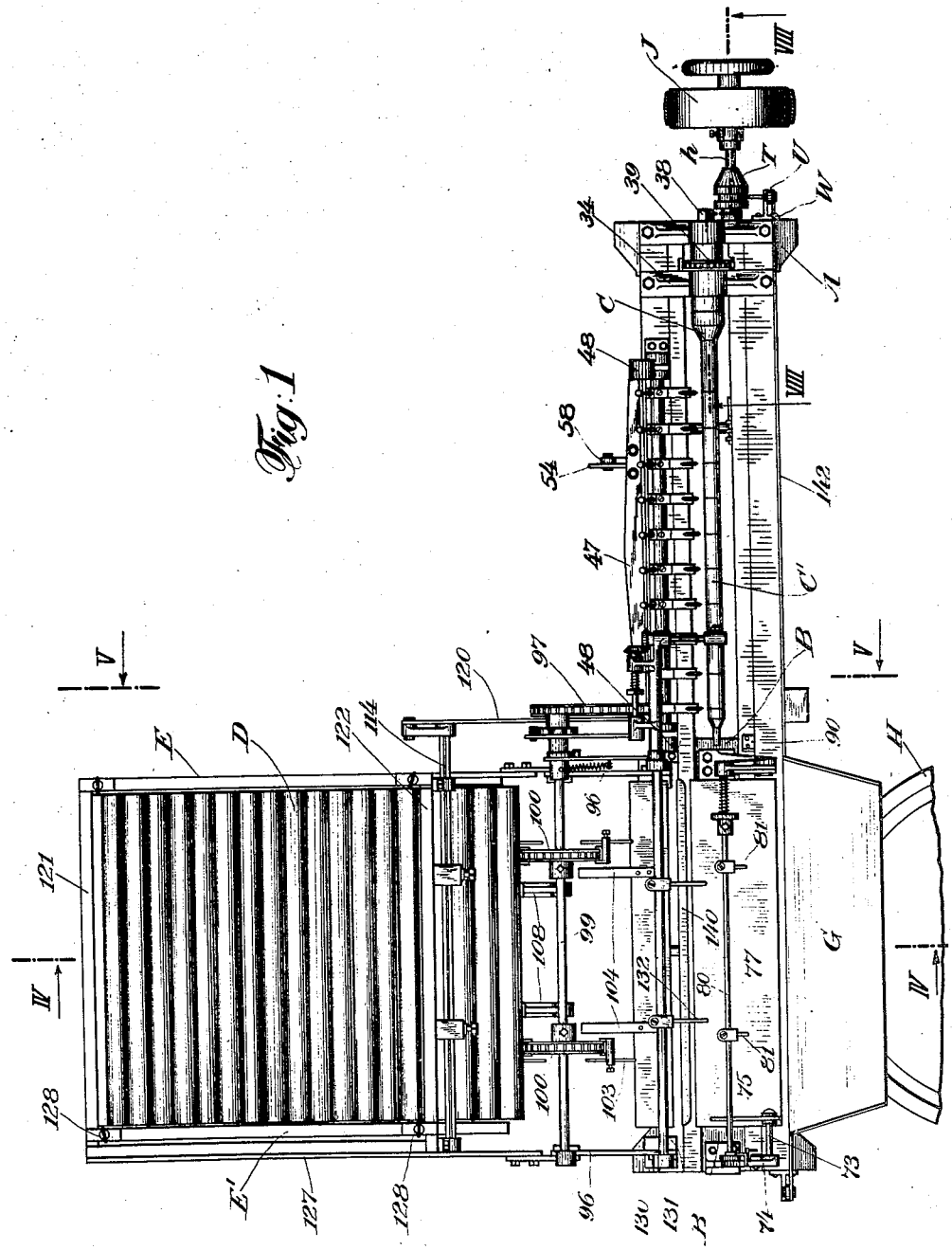

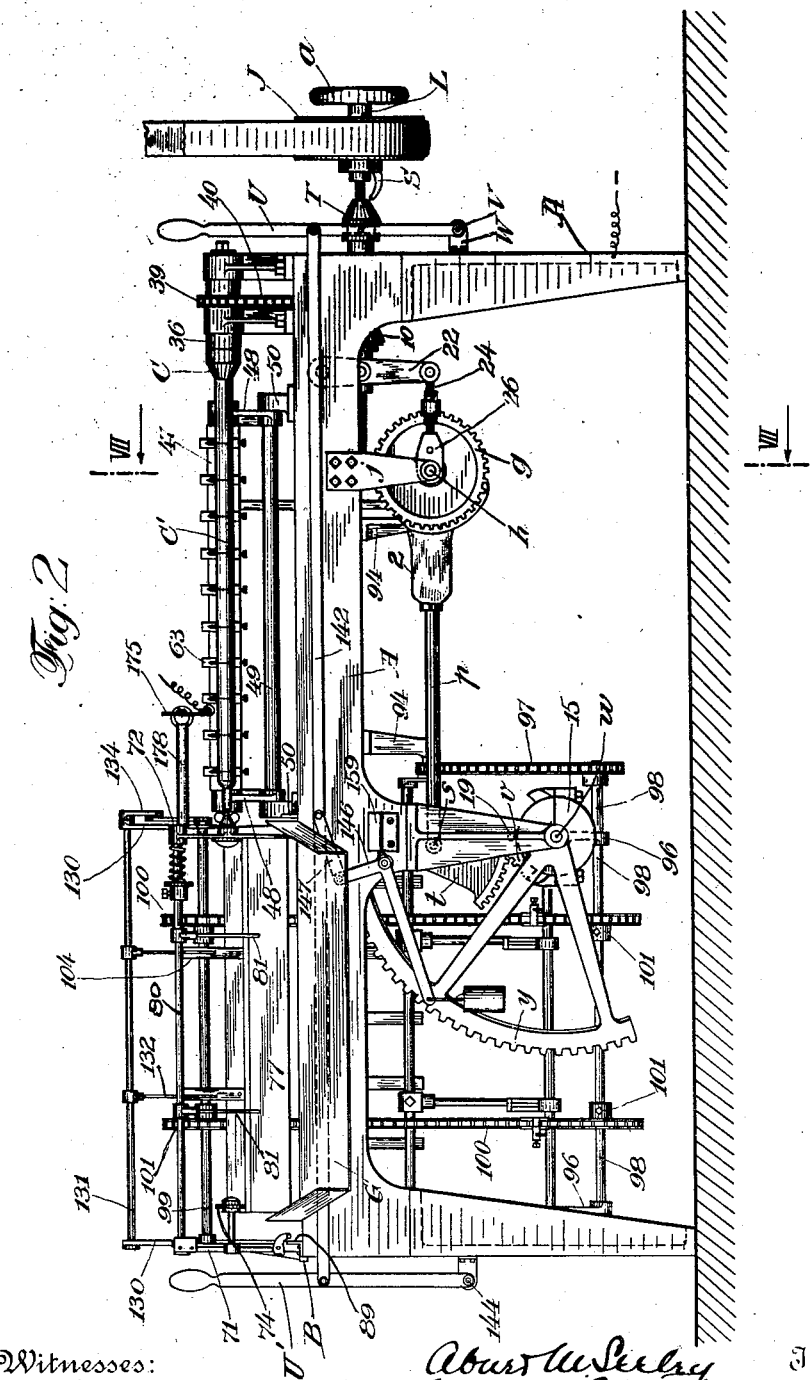

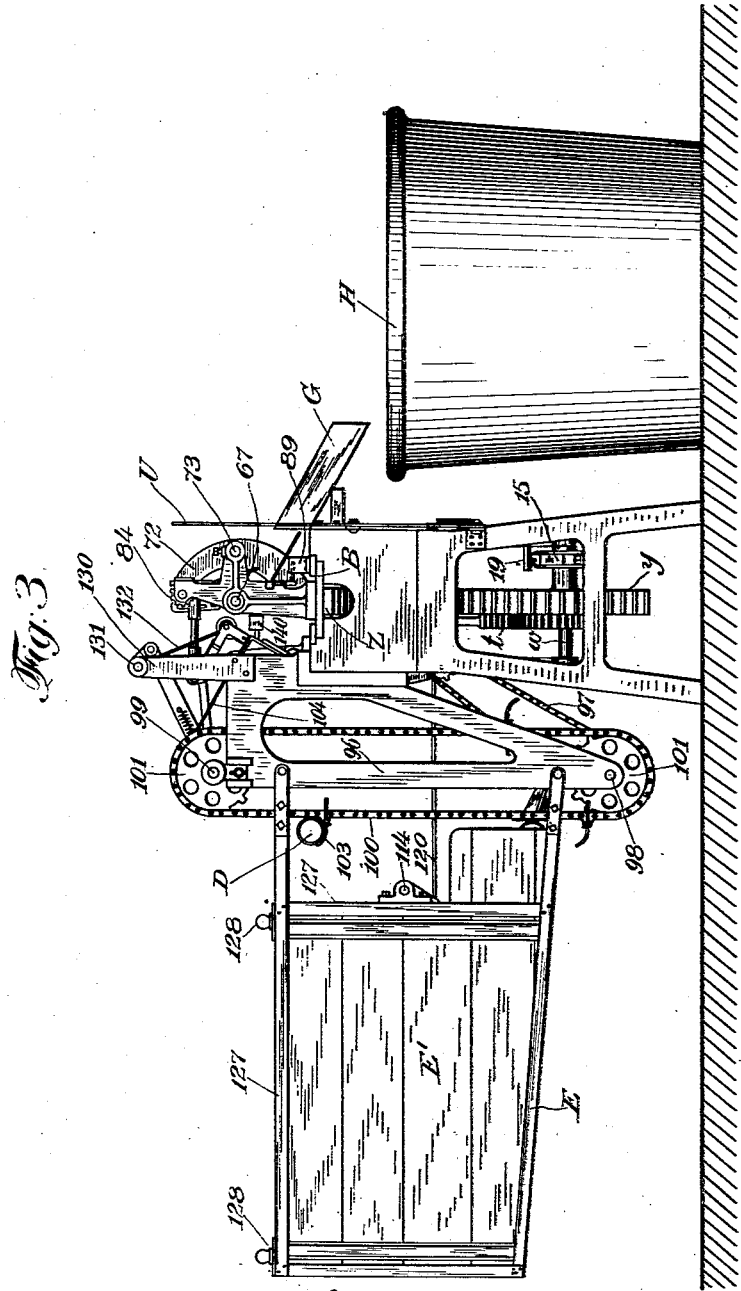

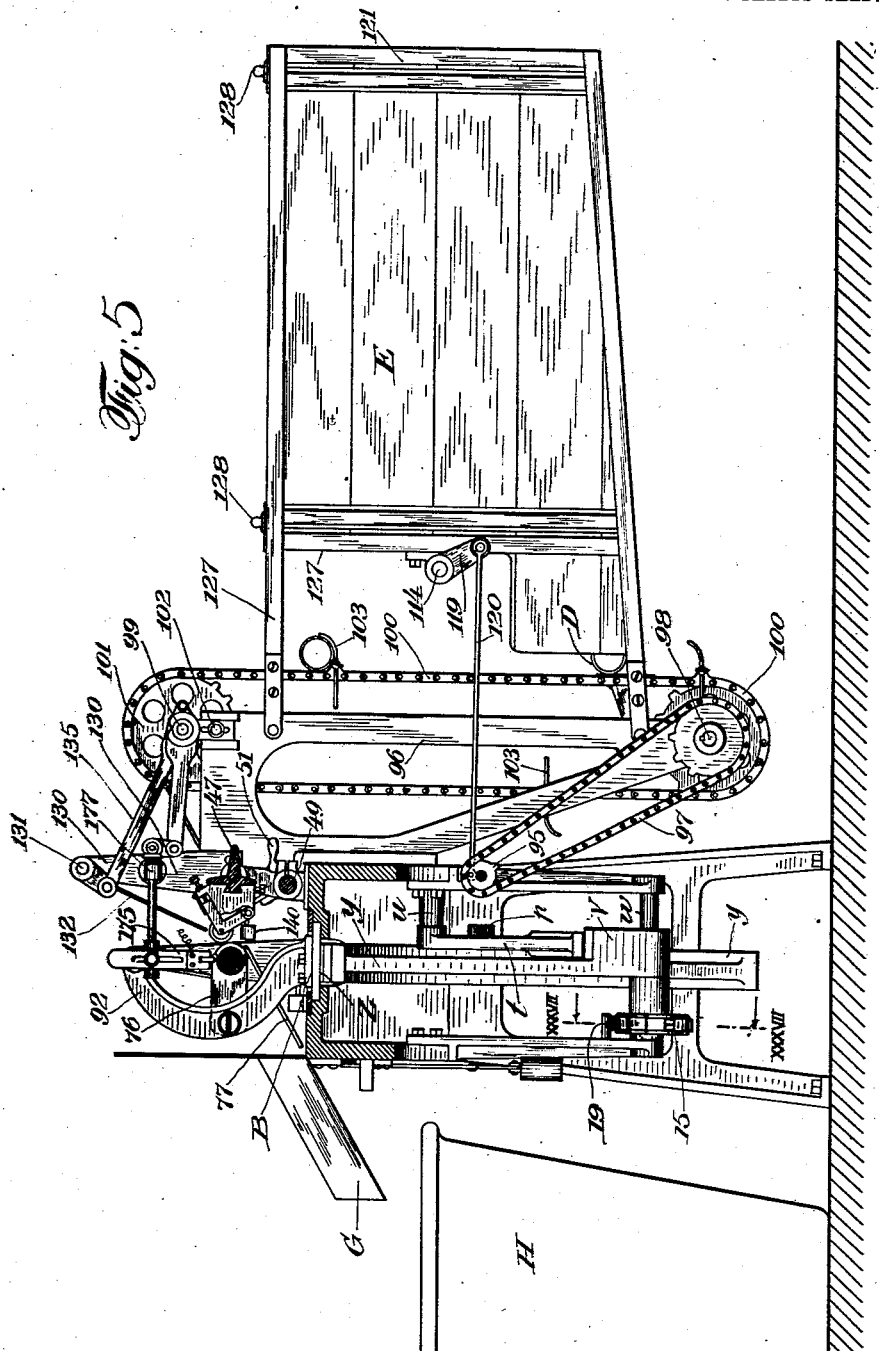

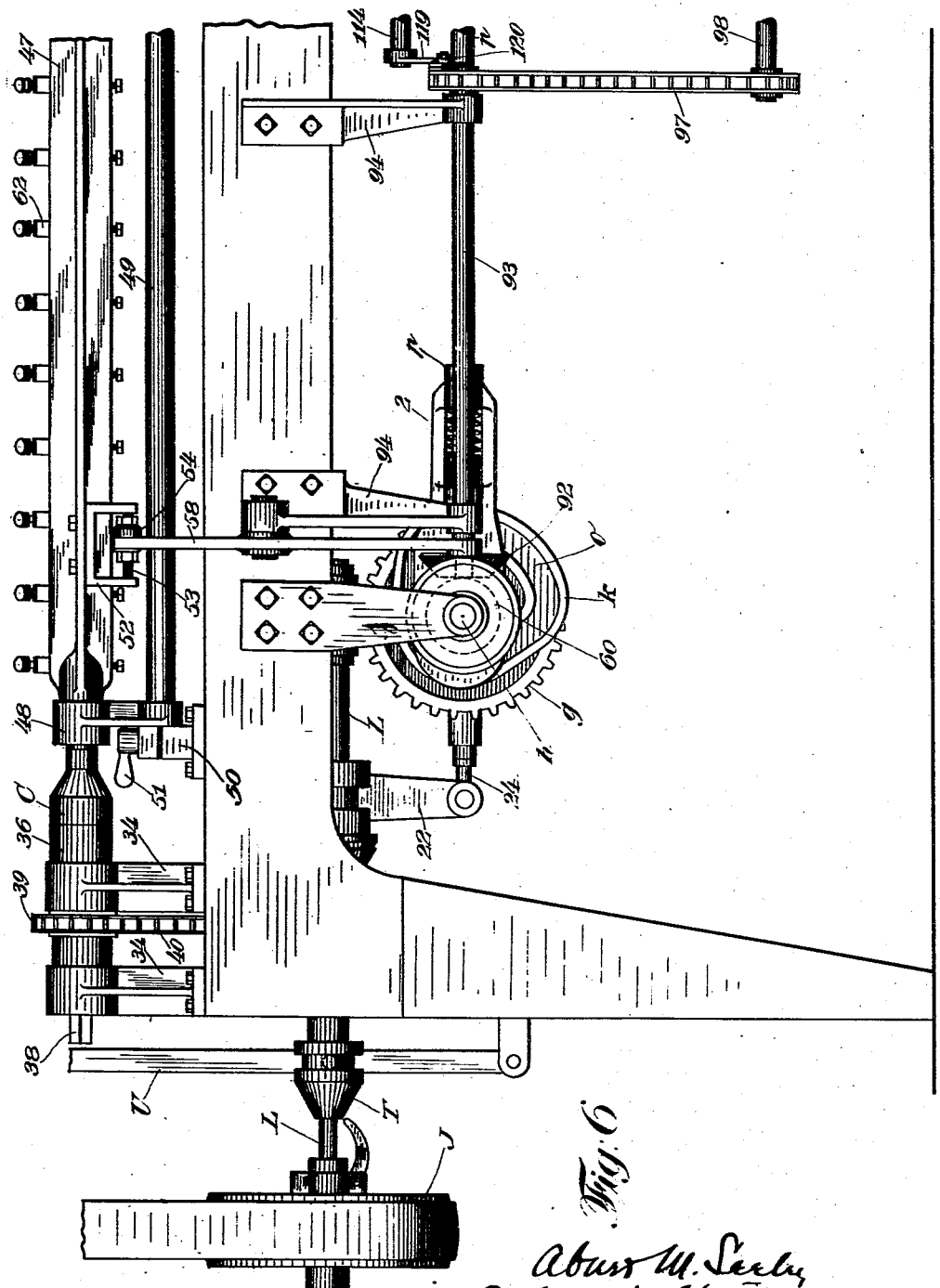

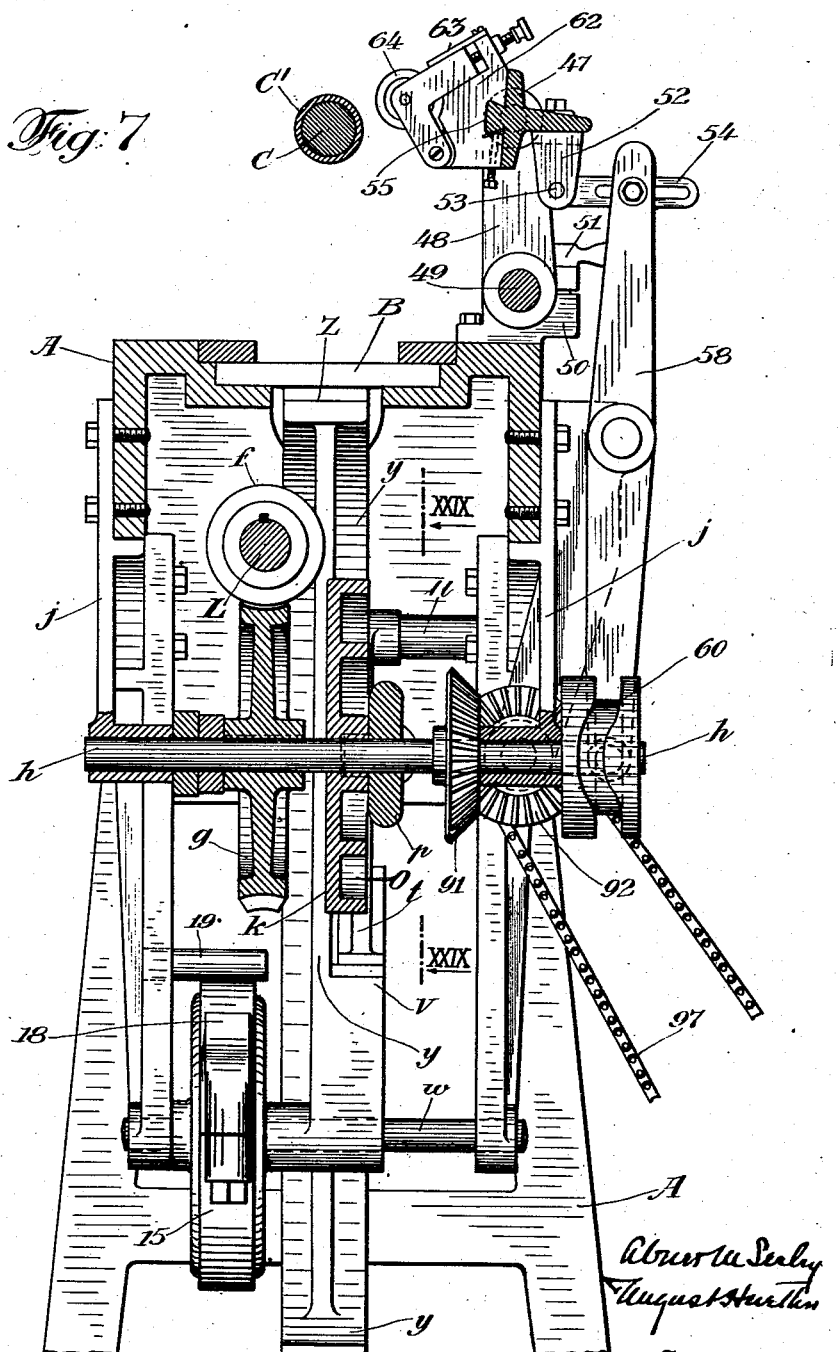

A. M. SEELEY & A. HUETHER.
AUTOMATIC TUBE CUTTING MACHINE.
APPLICATION FILED AUG. 10, 1910.
1,085,946.
Patented Feb. 3, 1914.
17 SHEETS—SHEET 8.
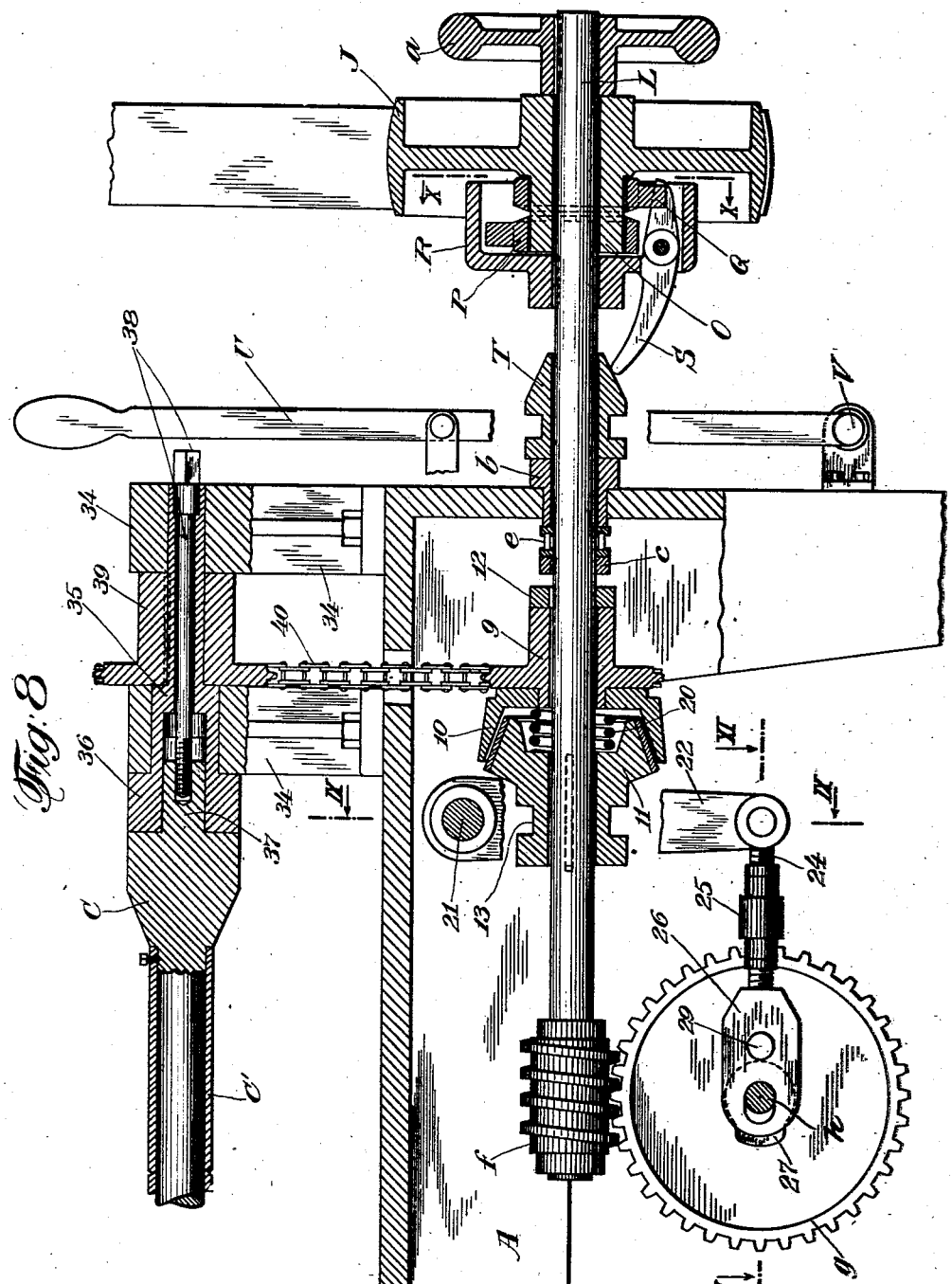

A. M. SEELEY & A. HUETHER.
AUTOMATIC TUBE CUTTING MACHINE.
APPLICATION FILED AUG. 10, 1910.
1,085,946.
Patented Feb. 3, 1914.
17 SHEETS—SHEET 9.
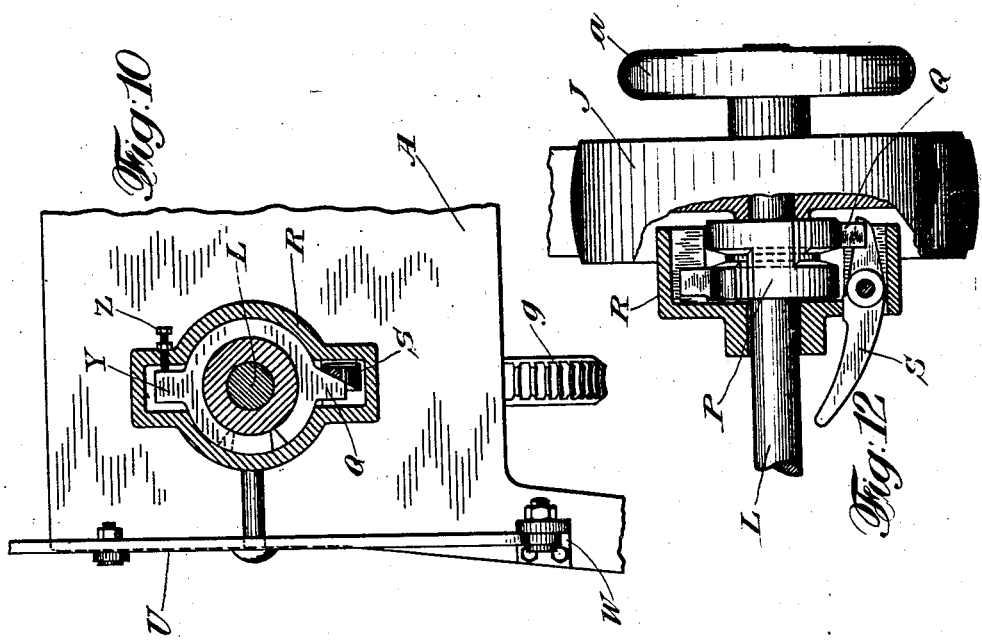
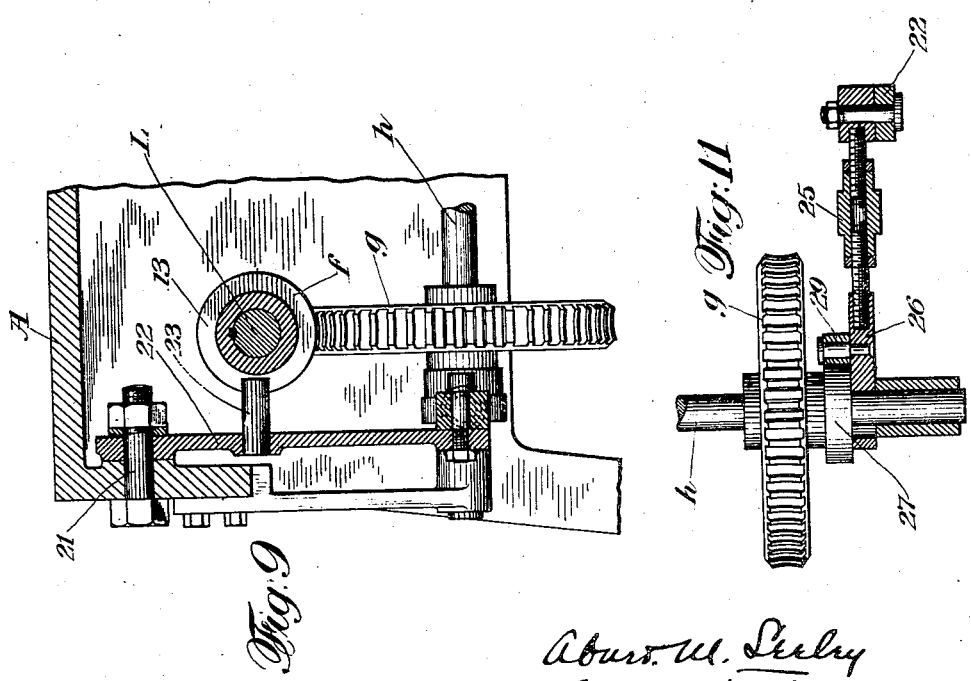

A. M. SEELEY & A. HUETHER.
AUTOMATIC TUBE CUTTING MACHINE.
APPLICATION FILED AUG. 10, 1910.

1,085,946.

Patented Feb. 3, 1914.

17 SHEETS—SHEET 10.

Witnesses:              Inventors

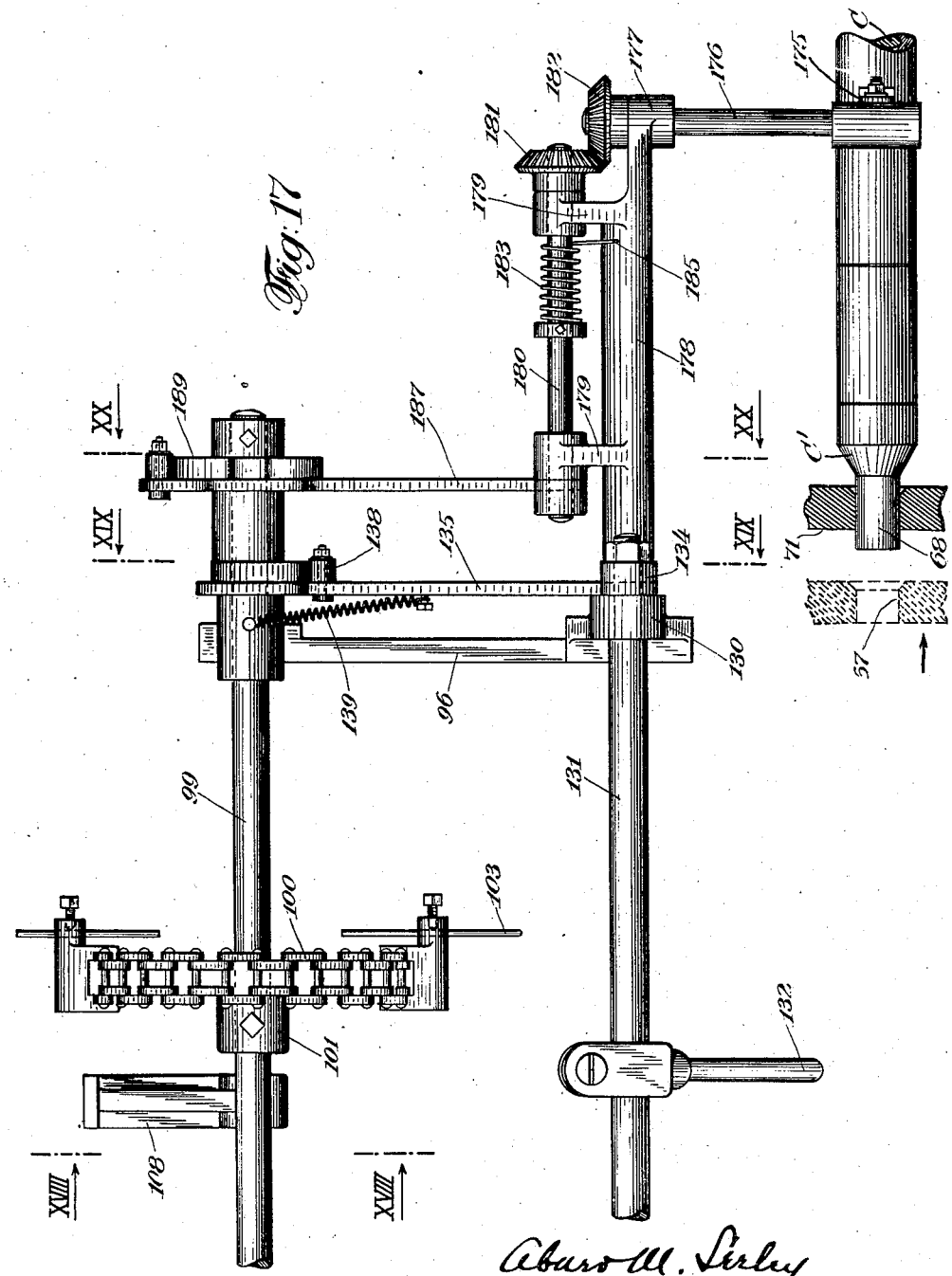

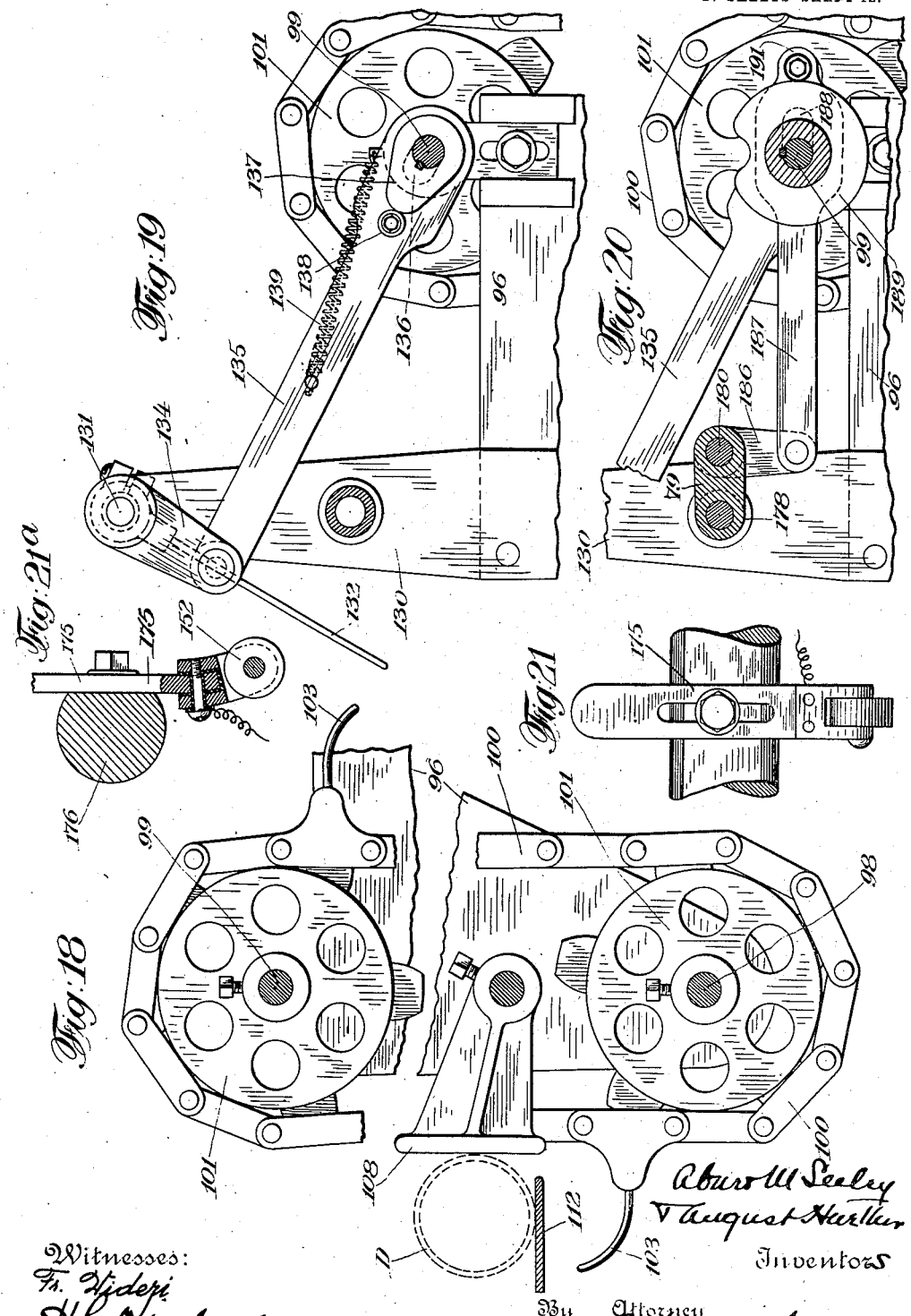

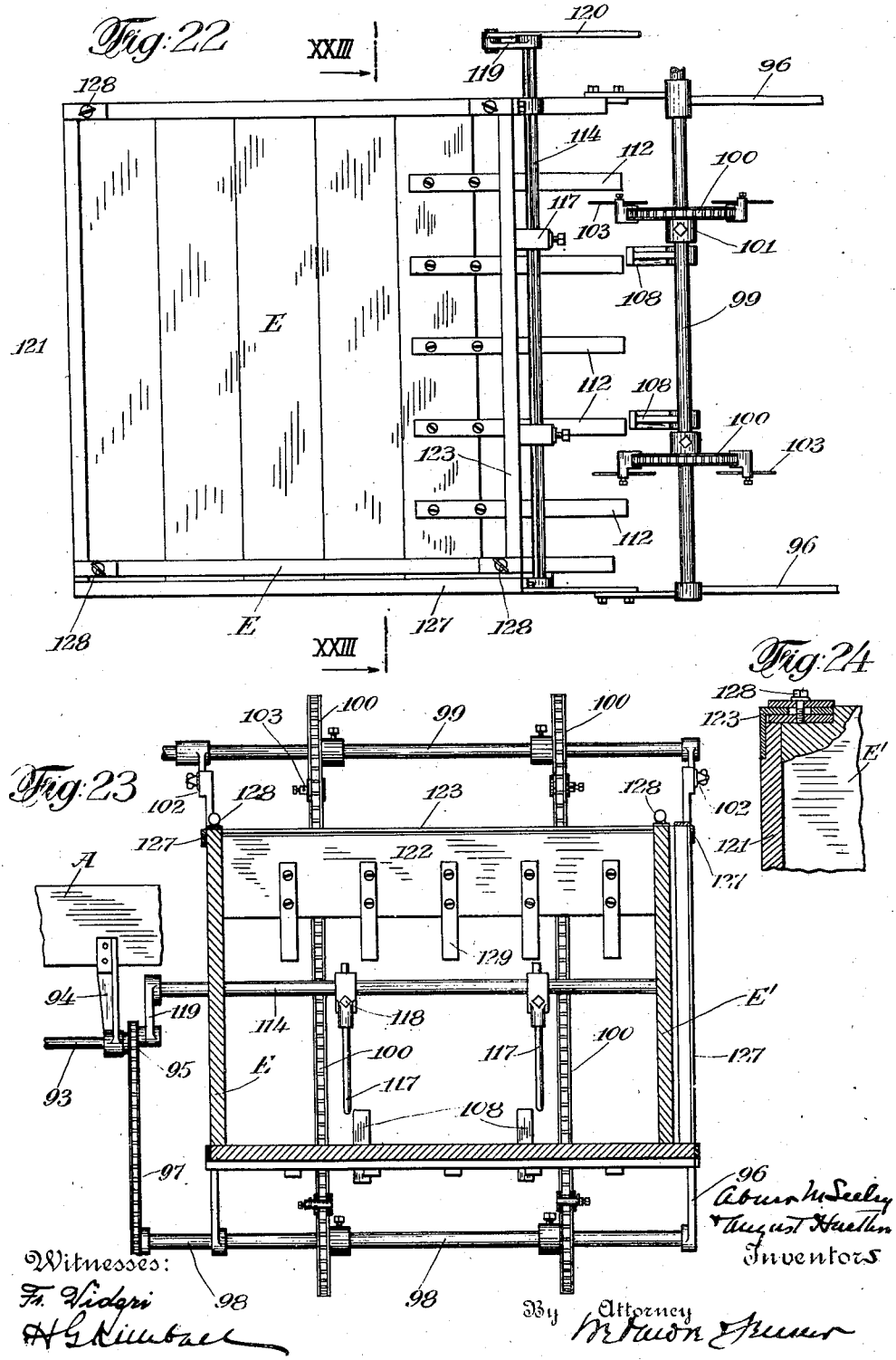

A. M. SEELEY & A. HUETHER.
AUTOMATIC TUBE CUTTING MACHINE.
APPLICATION FILED AUG. 10, 1910.
1,085,946.
Patented Feb. 3, 1914.
17 SHEETS—SHEET 14.
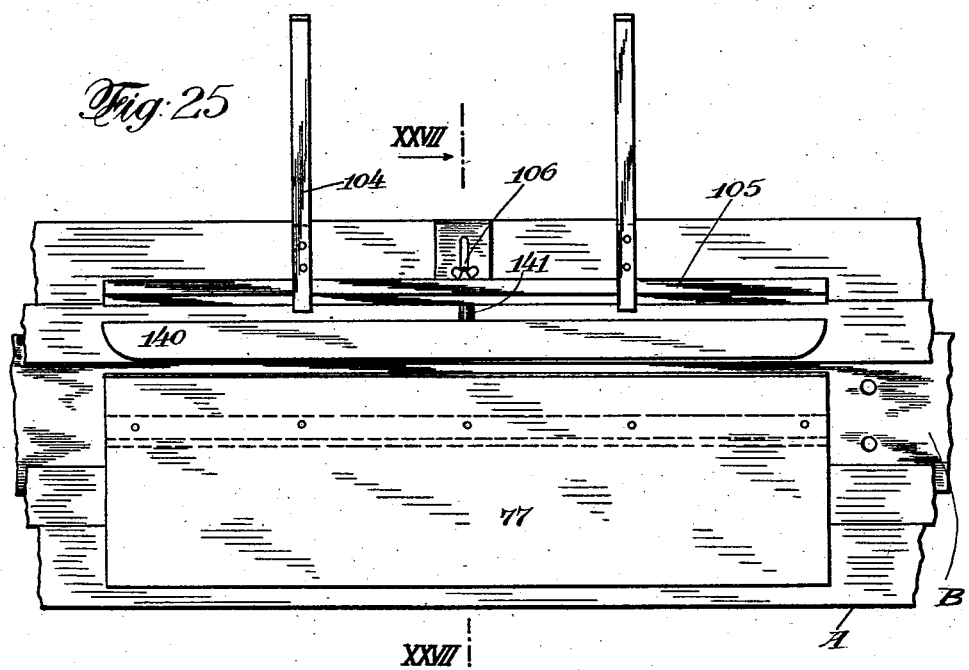
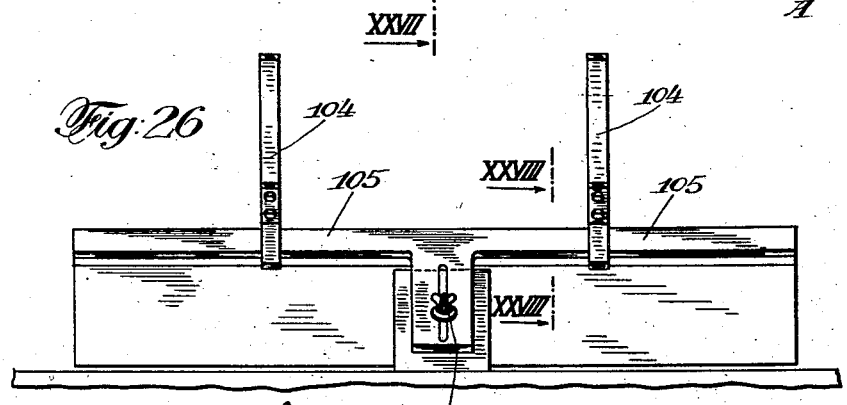
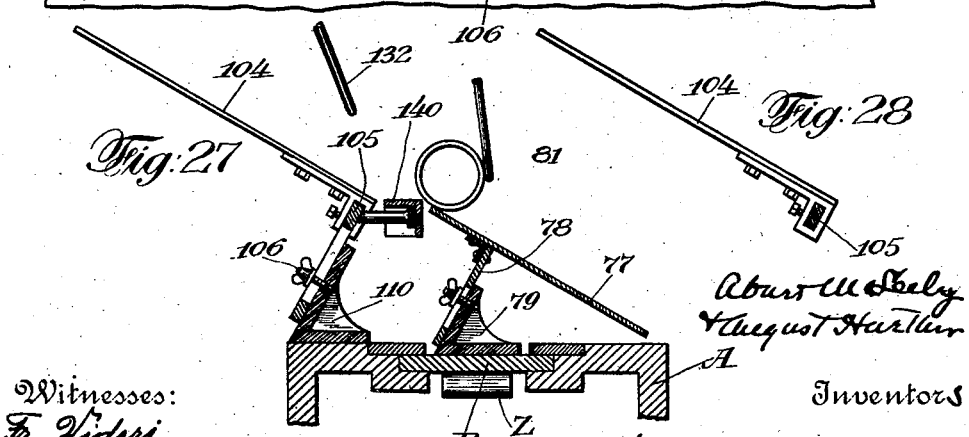

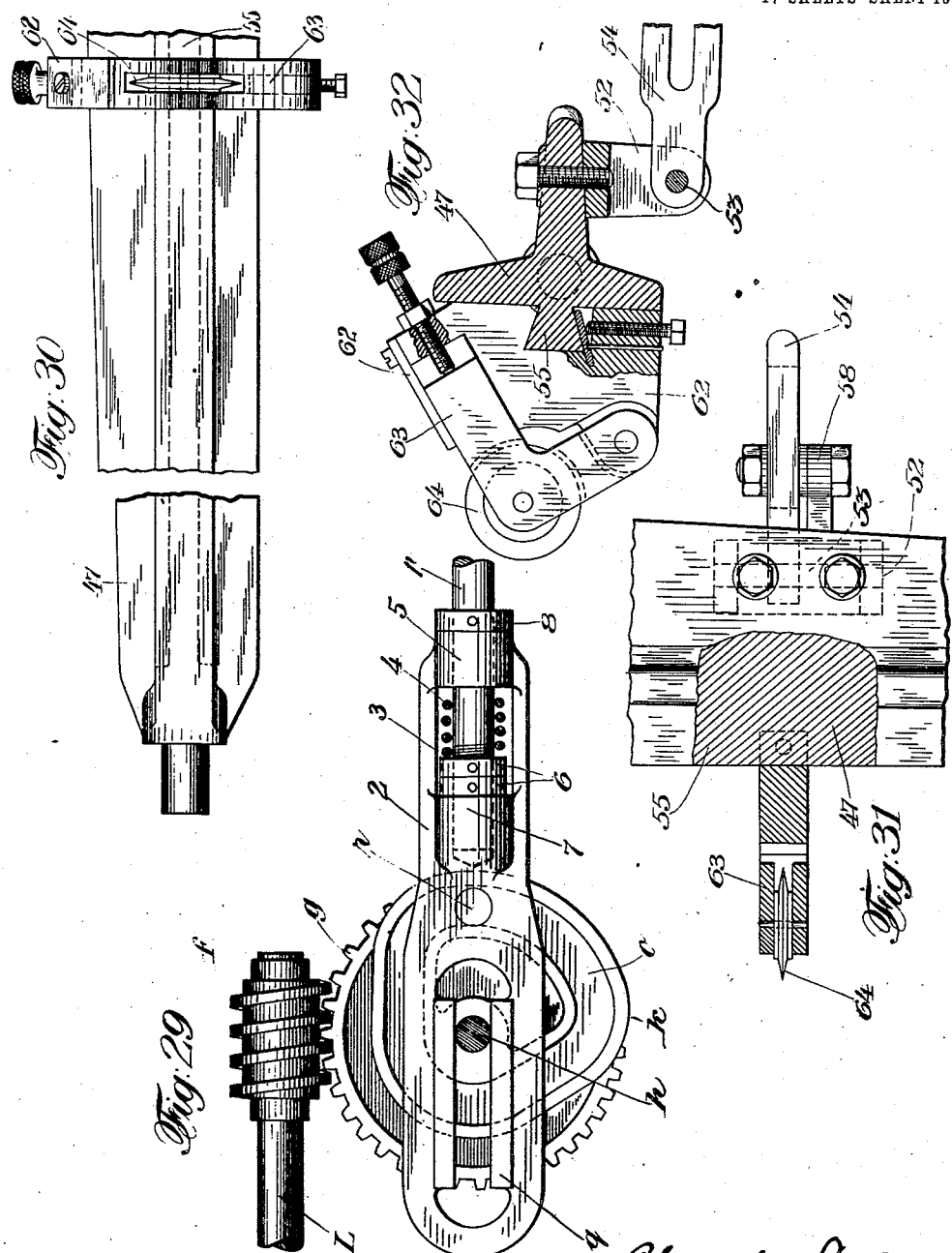

A. M. SEELEY & A. HUETHER.
AUTOMATIC TUBE CUTTING MACHINE.
APPLICATION FILED AUG. 10, 1910.
1,085,946.
Patented Feb. 3, 1914.
17 SHEETS—SHEET 16.
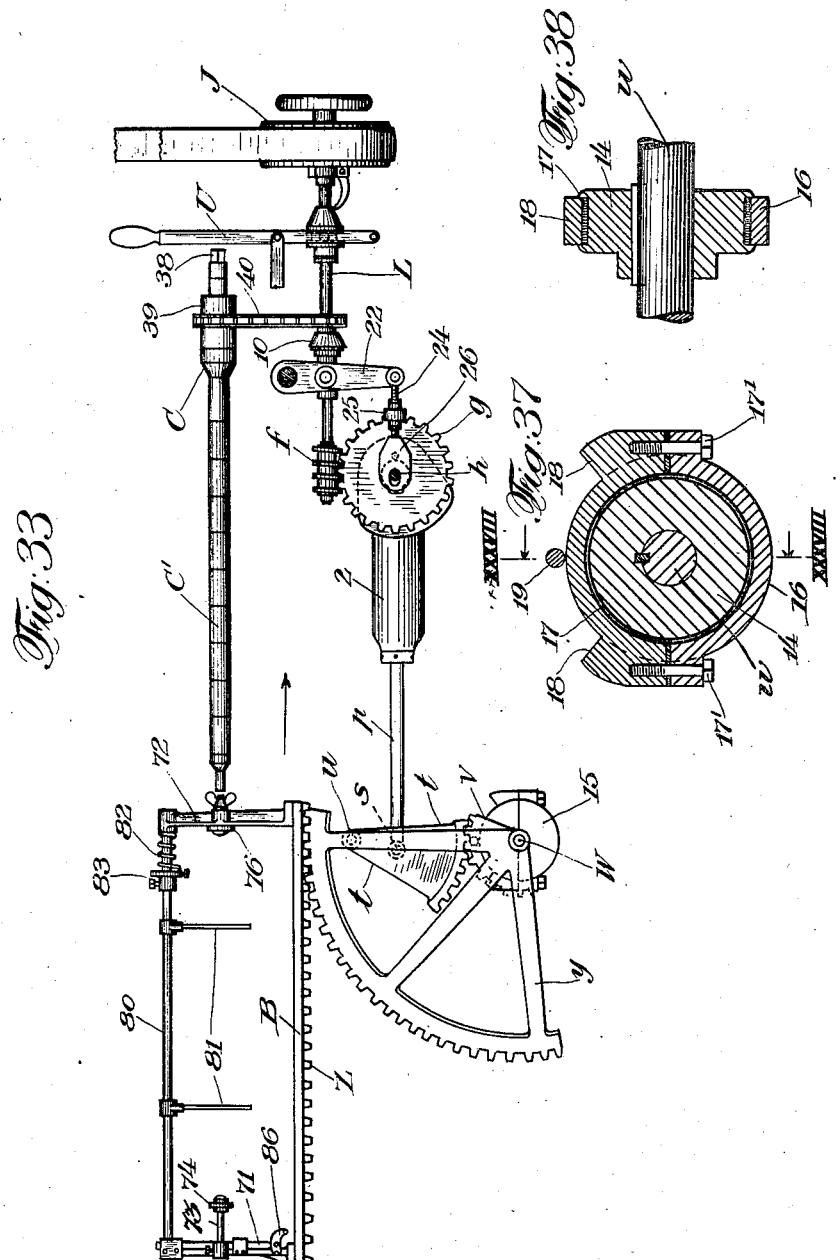

A. M. SEELEY & A. HUETHER.
AUTOMATIC TUBE CUTTING MACHINE.
APPLICATION FILED AUG. 10, 1910.
1,085,946.
Patented Feb. 3, 1914.
17 SHEETS—SHEET 17.
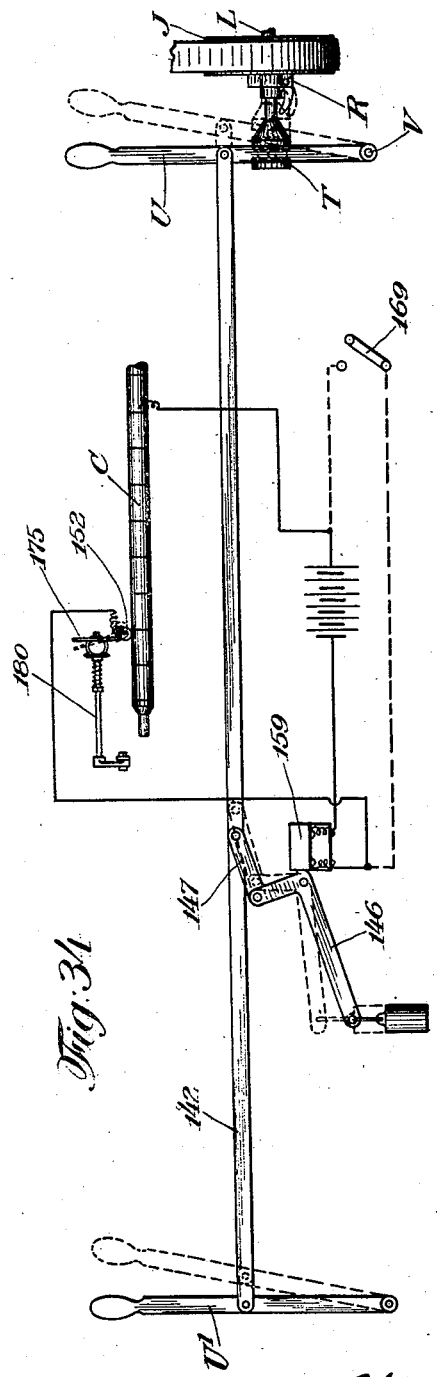
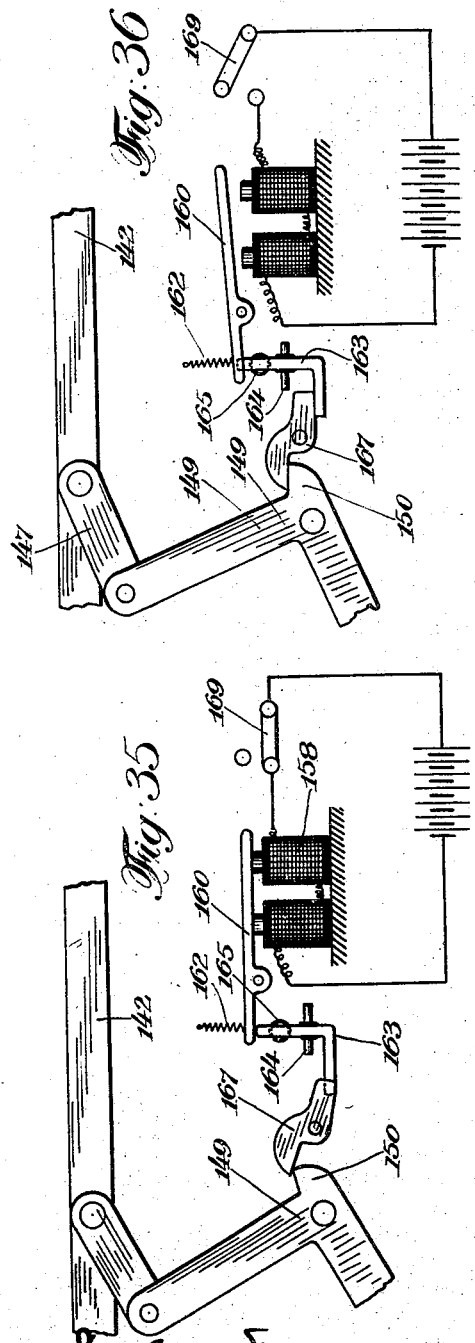

UNITED STATES PATENT OFFICE.

ABNER M. SEELEY, OF NEWARK, NEW JERSEY, AND AUGUST HUETHER, OF BROOKLYN, NEW YORK, ASSIGNORS TO EMPIRE PAPER TUBE & BOX COMPANY, OF NEW YORK, N. Y., A CORPORATION OF NEW YORK.

AUTOMATIC TUBE-CUTTING MACHINE.

1,085,946.  Specification of Letters Patent.  Patented Feb. 3, 1914.

Application filed August 10, 1910. Serial No. 576,567.

*To all whom it may concern:*

Be it known that we, ABNER M. SEELEY and AUGUST HUETHER, citizens of the United States, and residents of Newark, New Jersey, and Brooklyn, New York, have invented certain new and useful Improvements in Automatic Tube-Cutting Machines, of which the following is a specification, accompanied by drawings.

This invention relates to machines for cutting tubes, more particularly to an automatic machine for cutting paper tubes into lengths, and the objects of the invention are to improve upon the construction of such machines, increase their efficiency, reduce the wear and shock to the parts in operation and prolong the life of the machine.

Further objects of the invention will hereinafter appear and to all of these ends the invention consists of a machine for cutting tubes embodying the features of construction, combinations of elements, and arrangement of parts substantially as hereinafter fully described and claimed in this specification and shown in the accompanying drawings, in which—

Figure 13:
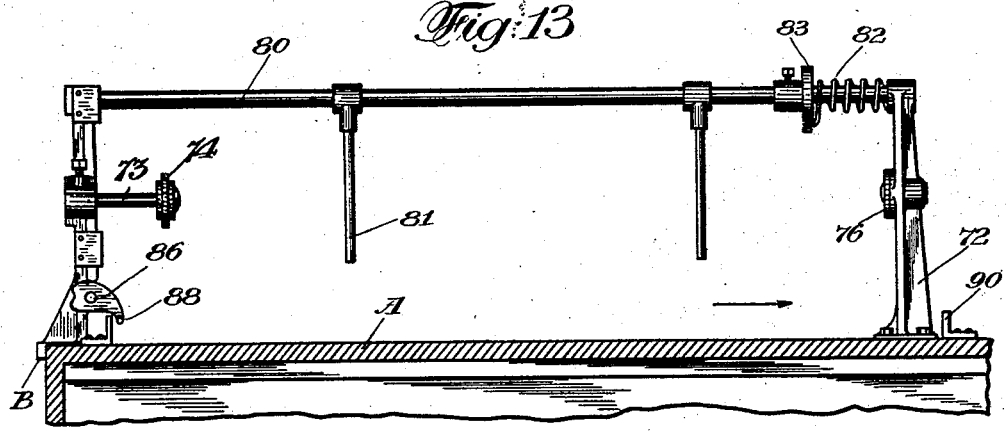
Figure 14:
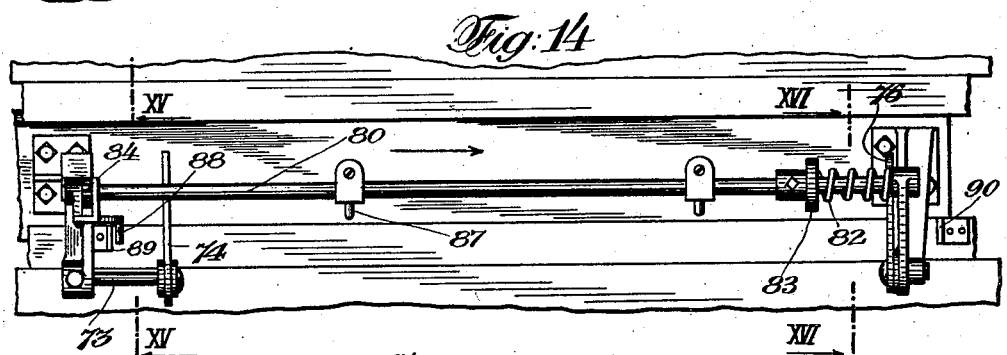
Figures 15, 15A, 16:
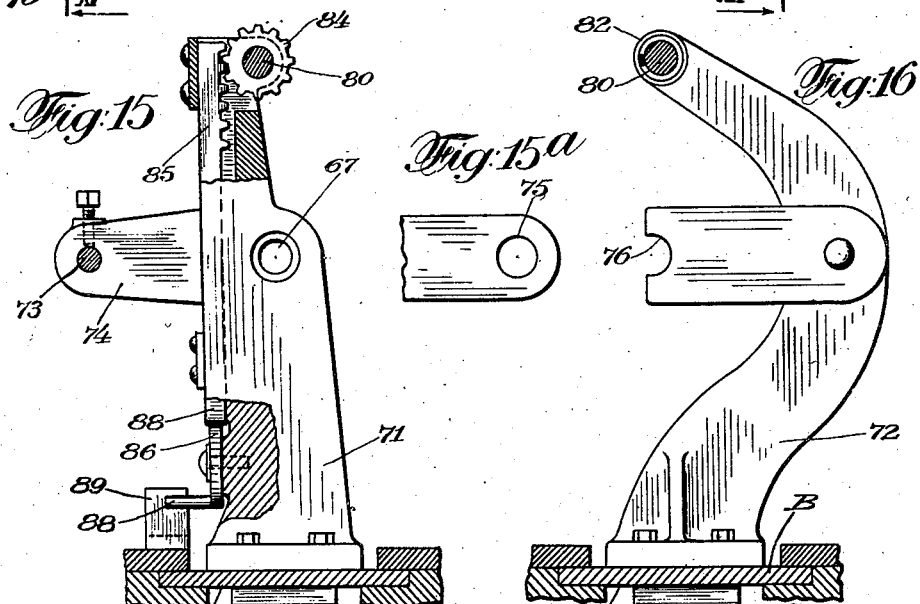

Figure 1 is a top plan view of a machine embodying the invention; Fig. 2 is a front elevation of the machine; Fig. 3 is an end elevation; Fig. 4 is an enlarged transverse sectional view on the line IV—IV of Fig. 1 looking in the direction of the arrows; Fig. 5 is an enlarged transverse sectional elevation on the line V—V of Fig. 1 looking in the direction of the arrows; Fig. 6 is an enlarged rear elevation partly broken away of one end of the machine; Fig. 7 is an enlarged transverse sectional elevation on the line VII—VII of Fig. 2; Fig. 8 is an enlarged longitudinal sectional view partly broken away on the line VIII—VIII of Fig. 1 looking in the direction of the arrows; Fig. 9 is a transverse detail sectional elevation on the line IX—IX of Fig. 8 looking in the direction of the arrows; Fig. 10 is a detail transverse sectional elevation on the line X—X of Fig. 8 looking in the direction of the arrows; Fig. 11 is a horizontal sectional detail plan view on the line XI—XI of Fig. 8 looking in the direction of the arrows; Fig. 12 is a detail front elevation partly broken away and partly in longitudinal section of the clutch for the driving pulley; Fig. 13 is an enlarged detail front elevation partly in longitudinal section and partly broken away of the reciprocating carriage; Fig. 14 is a top plan view of Fig. 13; Fig. 15 is a transverse sectional elevation on the line XV—XV of Fig. 14, looking in the direction of the arrows; Fig. 15ᵃ is a detail elevation partly broken away of the end of the pusher on the carriage; Fig. 16 is a transverse sectional elevation on the line XVI—XVI of Fig. 14 looking in the direction of the arrows; Fig. 17 is an enlarged top plan view partly broken away of the tube feeding mechanism; Fig. 18 is a transverse detail sectional view on the line XVIII—XVIII of Fig. 17 looking in the direction of the arrows; Fig. 19 is a detail transverse sectional elevation on the line XIX—XIX of Fig. 17 looking in the direction of the arrows; Fig. 20 is a transverse detail sectional elevation on the line XX—XX of Fig. 17 looking in the direction of the arrows; Fig. 21 is an enlarged detail end elevation partly broken away of the adjustable electrical roller contact adapted to coöperate with the tube arbor; Fig. 21ᵃ is a longitudinal sectional elevation of said contact partly broken away; Fig. 22 is a detail top plan view of the hopper and parts of the tube feeding mechanisms partly broken away; Fig. 23 is a longitudinal sectional elevation of Fig. 22 on the line XXIII—XXIII looking in the direction of the arrows; Fig. 24 is a detail transverse sectional elevation partly broken away taken through one of the upper corners of the hopper; Fig. 25 is an enlarged detail plan view partly broken away of the feed table; Fig. 26 is a rear elevation of Fig. 25; Fig. 27 is a transverse sectional elevation of Fig. 25 on the line XXVII—XXVII looking in the direction of the arrows; Fig. 28 is a detail view partially in transverse sectional elevation of a portion of the feed table; Fig. 29 is a detail longitudinal sectional elevation partly broken away on the line XXIX—XXIX of Fig. 7 looking in the direction of the arrows; Fig. 30 is a front elevation of Fig. 32 showing the knife bar; Fig. 31 is a top plan view of Fig. 32 partly in horizontal section and partly broken away; Fig. 32 is a transverse sectional elevation of Fig. 30; Fig. 33 is a detail front elevation of the mechanism for reciprocating the carriage; Fig. 34 is a diagrammatic representation partly in front elevation and partly broken away showing the electrical connections for stopping the machine, either automatically or by hand; Fig. 35 is a detail view partly diagrammatic and partly in front elevation of the electro-magnetic controlling device for the clutch bar with the parts in locked position; Fig. 36 is a view corresponding with Fig. 35 with the parts released; Fig. 37 is an enlarged detail longitudinal sectional view taken through the friction device on the main segment shaft on the line XXXVII—XXXVII of Fig. 5 looking in the direction of the arrows; Fig. 38 is a transverse sectional view of Fig. 37 on the line XXXVIII—XXXVIII.

Referring to the drawings, A represents the frame of the machine upon which is mounted a reciprocating carriage B and an intermittently revoluble mandrel C, both extending longitudinally of the machine and substantially in line with each other. The paper tubes D to be cut are fed from the hopper E to the carriage B, and are carried over the mandrel C and cut into lengths by the cutter mechanism, after which the cut sections of tube are stripped or removed from the mandrel and fall through the chute G to the receiver H.

The driving pulley J is loosely mounted on the main driving shaft L and is adapted to be connected to the driving shaft by suitable clutch mechanism. In this instance (see Figs. 8, 10 and 12) the pulley J is provided with a boss O on which is loosely mounted the split spring ring P, having the beveled toe Q. Outside of this ring P is a casing R fast to the shaft L and having a lever S pivotally mounted therein, the outer and longer curved end of which projects into proximity to the beveled sleeve T loose on the main shaft. A hand lever U, pivoted at V on a suitable bracket, engages an annular groove in the beveled sleeve T by means of the pin shown, so that by operating the hand lever the shorter arm of the lever S may be moved into engagement with the beveled toe Q, in the obvious manner, thereby tightening the split ring P on the driving pulley. The said split ring operates under such conditions as a band clutch, being confined to revolve with the casing R by means of the extremity Y which abuts against an adjustable set screw Z in a chamber therein. The operation of the hand lever U thus causes the shaft L to be clutched to the driving pulley for driving the machine. On the outer end of the drive shaft L is placed a hand wheel $a$ by which the main shaft can be manually rotated.

The shaft L is suitably supported in the bearing $b$ in the machine frame, and adjacent this bearing inside the frame is placed a collar $c$ fast on the shaft L. Between collar $c$ and bearing $b$ there are placed a series of rollers $e$ constituting a thrust bearing for the drive shaft L. The inner end of the shaft L carries a worm $f$ meshing with a worm wheel $g$ on the cross-shaft $h$ which latter is supported in suitable bearings in the two brackets $j$ (Fig. 7). The cross-shaft $h$ carries the cam $k$ through which the tube carriage B, later described, is actuated. In the present instance this cam is a face cam formed with a cam-groove marked $o$. The connecting rod $p$, having a yoke-bearing $q$ (Fig. 29) on the said shaft $h$, is provided with a cam-stud $r$ engaged in the cam-groove whereby the said rod is reciprocated as the cam is revolved. The other end of connecting rod $p$ is pivoted at $s$ to the segment $t$ hung on the stud $u$, as appears more clearly in Figs. 4, 5 and 7. Segment $t$ meshes with a short-radius segment $v$ formed on the hub of a larger segment $y$ which is fast on a cross-shaft $w$. The teeth of the large segment mesh with the inverted rack $z$ on the bottom of the tube carriage B. Rotation of the main driving shaft L transmits motion through the worm and wheel $f$, $g$, and the cam $k$ to the connecting rod $p$ and thence through the segments $t$ and $y$ to the carriage B in an obvious manner, imparting to the latter a reciprocating motion corresponding to the design of the cam groove $o$. As shown more clearly in Fig. 29, the head portion 2 of the connecting rod $p$ is provided with means to allow a certain amount of lost motion between the cam and the carriage, and this provision constitutes an important feature of the present invention. The head 2 is formed as a sleeve on the end of rod $p$ and has a lateral recess 3 containing a coil spring 4, surrounding the rod. One end of the spring thrusts against an adjustable abutment of the rod, in the form of a nut and lock nut 6 thereon, while the other end thrusts against the tubular portion 5 of the head. The nuts 6 serve to limit the inward thrust of the rod, by their engagement with the part 7, and outward movement is resisted by the elastic force of the spring 4. The yielding extensibility of the connecting rod that is thus afforded by the spring facilitates the movement of the carriage and at the same time averts injury to the machine in case of accidental obstruction to such movement.

We have found that while the mechanism above described constitutes an extremely effective means for reciprocating the tube carriage, the operation thereof is essentially improved by the provision of retarding devices, adapted to slow down the motion of the parts near each end of the reciprocation. To this end we provide a braking mechanism, shown at 15 in various figures of the drawings, applied to the shaft $w$ on which the main segment $y$ is mounted as above explained, although the same or equivalent braking means could be applied to other parts of the described mechanism with similar effect. As applied to the shaft $w$, the said device (Figs. 37 and 38) comprises a hub or drum 14 fastened thereto and surrounded or embraced by two half-collars 16 and 18 with a leather friction ring or lining 17 between the proximate surfaces of the drum and the surrounding parts. The friction ring 17 is clamped with some pressure upon the drum by the two bolts 17', the pressure or friction produced being variable by varying the degree to which the bolts are tightened. The two half collars are thus adapted to rock with the shaft $w$ and segment $y$, but the extent of their rocking movement is limited in both directions to an arc less than that of the shaft and segment, as for instance, by means of the fixed stud 19, which is alternately engaged by the opposite shoulders on the collar 18 as shown by Fig. 37. The motion of the segment and its operated parts is thus retarded by the friction of the drum 14 at each end of their reciprocation.

The tubes received by the carriage B, in the manner later described, are carried by it and placed one at a time on the horizontal mandrel C upon which they remain, and by which they are revolved, while being cut into the desired lengths. This mandrel is carried in suitable rigid journals, marked 34, and is driven or rotated intermittingly from the drive shaft L in the following manner: The said shaft L carries loosely thereon a sprocket wheel 9, geared through a sprocket chain 40 with a corresponding sprocket 39 of the mandrel C. On one side the sprocket wheel 9 is provided with one of the members 10 of a friction clutch, the complementary clutch member 11 of which is splined to the drive shaft and normally repelled from the member 10 by the interposed coil spring 20. A collar 12 fast on the shaft L holds the sprocket from endwise movement. The annular groove 13 in the hub of the member 11 is engaged by a stud 23 of a lever 22, the latter being hung from the frame on a stud bolt 21 and pivotally connected by its free end to the end of an adjustable cam rod 24 of the cross shaft $h$ above described, so that the said lever 22 may be appropriately operated to close the clutch member at the proper moment and thereby connect the mandrel C with the power shaft for operation thereby. The cam rod 24 is adjustable in length by means of a right and left handed nut 25 of well understood operation, and its terminal portion 26 is yoked over the cross-shaft as a support, and provided with the cam stud or roller 29, by which it is reciprocated by the cam 27 on shaft $h$, all as clearly shown in Figs. 8, 9 and 11 of the drawings.

The mandrel C is removable from the machine so that it can be substituted by others of different lengths or diameters, and its mounting for this purpose comprises a hollow spindle 35 which is journaled in the two uprights 34 with the driving sprocket 39 fast thereon between the bearings. The inner end of the spindle overhangs the inner bearing forming a head 36 (Fig. 8) which is recessed to receive the reduced end 37 of the mandrel C (Fig. 8), and the latter is held firmly in the recess and against the face of the head 36 by means of a long, square-headed bolt 38 occupying or fitting the interior of the spindle. The operation of removing and installing the mandrel will be apparent from a consideration of the drawings. The mandrel is covered with a removable sleeve marked C' which is adjustable thereon and forms a smooth backing upon which the paper tube rests while being cut by the several knives, thereby providing for the cutting of uniformly clean edges in all of the tube sections. In the event of wear of the backing sleeve, resulting from the action of the cutters thereon forming creases or grooves in the sleeve, the latter is shifted along the mandrel so as to present a fresh smooth surface to the knives, a small set screw, appearing in Fig. 8, at the end of sleeve C' being used to hold the sleeve in its newly adjusted position.

The cam controlled clutching mechanism, above described, is timed to operate, and start the rotation of the mandrel C, immediately upon the placing of the tube thereon by the tube carriage B, whereupon the knife mechanism for severing the tube is brought into action upon the tube. This mechanism is carried on a longitudinal shaft 49 held in suitable bearings 50 on the machine frame which are provided with screw handles 51 for setting the caps of the bearings firmly upon the shaft to prevent any undesirable looseness or play. The knife bar 47 extends parallel to the shaft 49 being supported thereon by the two rocker arms 48 at or near the opposite ends of the said shaft as shown in Figs. 2 and 6. The knife bar, which is shown in larger scale in Fig. 30, is formed with end gudgeons pivotally held in the upper ends of the rocker arms 48, and on its rear flange it is provided with a pendant bracket 52 carrying a pin 53. The pin forms the connection between the knife bar and the means whereby the said bar is advanced and withdrawn from the work. It is threaded and supports a link 54 thereon which is held in place by two opposing nuts. The free end of the link is pivotally connected to a cam lever 58, suitably fulcrumed as shown, and actuated by the cutter cam 60, (Fig. 7). For purposes of adjustment of the knife bar with reference to its actuating cam, the link 54 is slotted as shown, so that the inward position of the cutters can be set to accommodate a large variety of diameters of tubes. The cam 60 is carried fast on the end of the cam shaft $h$ above referred to and is constantly driven when the power shaft L is coupled to the driving pulley. Since it is driven by the same shaft that drives the carriage B, its time of operation bears a fixed relation to that of the carriage according to the design of the respective cams.

According to this invention the tube placed on the mandrel C can be divided or severed into any desired number of lengths, and the ends of the uncut tube, that are likely to have been jammed or marred by previous handling can also be trimmed off clean if desired and tubes can be cut up into sections of different lengths as desired, whereby the whole length of the uncut tube can be utilized without waste. To this end the side of the knife bar 47 that is proximate to the mandrel is formed or provided with a longitudinal way, conveniently formed as an undercut rib or tongue marked 55. This rib supports a series of slides 62 fitted thereto and each carrying a holder 63 for one of the knives. Each slide is set on the rib 55 with the usual take up gib and set screw (Fig. 32) so that it can be adjusted longitudinally along the knife bar and firmly clamped or set in its fixed position. The knife holders 63 are supported on their slides with provision for adjustment toward and from the mandrel C in order that all of the series of knives on the bar may be set to bear simultaneously and equally upon the work. The knives consist, preferably, of rotary steel disks, shown at 64, and when properly spaced on the knife bar 47 of the mandrel and adjusted with reference to the mandrel, will bear uniformly upon the sleeve on the latter in such manner as to produce cleanly cut edges on each severed tube section.

The cross shaft $h$ which has been above referred to, is equipped with a bevel gear 91 which meshes with the bevel gear 92 of a longitudinal counter-shaft 93, the journal bearings of which are provided by the two depending brackets 94. Motion is derived from this bevel geared counter-shaft for operating the feed mechanism which supplies uncut tubes to the tube-carriage B. The sprocket wheel 95 on this shaft drives through its sprocket chain 97, the lower shaft 98 of a tube-elevating chain which is journaled in the lower extremity of two parallel vertical frame plates 96 secured as brackets to the rear side of the main frame of the machine. The upper chain shaft 99 corresponding to the shaft 98, is carried in the upper part of these bracket frame plates and the two are connected by one or more sprocket carrier chains 100, which are trained over the sprocket gears 101 that are fast on the said shafts. The bearings of the upper chain shaft 99 are made to be adjustable on the frame 96, as indicated at 102 in Fig. 23 and elsewhere, so that the two chains can be tightened as desired. While it is preferred to use two separate chains working in unison on the same shafts, it will be understood that a single broad chain can be used in place of two or more separate chains.

The hopper E in which the tubes to be cut are contained, is fastened in an extended position upon the same frame-plates 96 that support the elevator chain. The bottom floor of the hopper is inclined so that the tubes therein can roll or slide toward the ascending stretches of the two elevator-chains and the front extremity of the floor is formed by a grid consisting of a series of projecting slats 112 on which the tubes are supported adjacent to the chains. Both chains are provided at corresponding intervals with curved fingers 103 projecting rearwardly a suitable distance and so disposed that they can pass through the spaces between the slats and pick up one of the tubes therefrom, carrying it upward to be delivered to the tube-carriage B in the manner presently described. These fingers are held in specially formed links forming part of the chains and are slightly offset from the plane of the carrier wheels 101 so that they will not conflict with the latter, and they are also adjustable in links so that they can be projected more or less from the chain in order to accommodate different diameters of tubes. The floor and front and rear walls of the hopper are secured in fixed relation to the fixed framing, but one or both of its side walls are adjustable in the transverse direction so that the width of the interior of the hopper can be adjusted in conformity with the length of the tubes which it is intended to handle. By reference to the drawings, particularly Figs. 4, 22, 23 and 24, it will be seen that the short front wall marked 122 and the rear wall marked 121 are stayed to the floor and to the frame 96 by a skeleton framing of angle irons designated 127 and that one or both of the two side walls E' are adapted to be moved toward or from each other inside of the front and rear walls. When the width of the hopper is properly adjusted, the side wall is fastened in place. Fig. 24 shows the means whereby the side walls are guided in their adjustment movement and clamped in their adjusted position. This means comprises an angle iron 123 rabbeted in the upper margins of the front and rear walls and forming a slide upon which the side wall E' is supported. The latter is provided with two clamping plates embracing the horizontal flange of the angle iron 123 and a clamping bolt 128 by which they may be clamped rigidly thereto, as clearly shown in the figure referred to.

As the tubes are apt to be carelessly placed in the hopper, it is desirable to provide against the possibility that some of them will become crossed with others and impede or obstruct the feeding movement. The device employed for this purpose in the present invention comprises a rock-shaft 114 journaled on the skeleton framing 127 and carrying a pair of arms 117. The rock-shaft is connected by a crank 119 and connecting rod 120 with a wristpin on the face of the small sprocket gear 95 of the longitudinal counter-shaft 93, which has been above described. The oscillation thus imparted to the rock-shaft 114 vibrates the arms 117, which keeps them pushing against the mass of tubes in the hopper as the latter tend to roll downwardly on the inclined floor and thus works them all into parallel relation so that they will proceed in orderly arrangement to the position in which they are taken by the elevator chain. The arms 114 are adjustable as to length by the manipulation of the set screws 118 and in order that their upper ends may not conflict with the hopper wall 122, the latter is formed at its lower edge by a series of depending slats 129 offset with respect to the said arms. The tubes which escape beneath the vibrating arms 117 and rest upon the slats 112 are under the pressure of the mass of tubes above them, and in order that they may not be disarranged or abraded by contact with the portions of the chains between the carrier fingers, means are provided for stopping them just in advance of contact with the chain but still in a position where the said fingers can take them at the proper time. This means comprises, in the present instance, a pair of abutment arms 108 set on a fixed shaft 116 and projecting between the ascending stretches of the two chains. As shown in Fig. 4, the roll next to the chain is in a position to be taken by the finger 103, but is held out of contact with the chain by the abutments just described. In passing over the upper carrier wheels, the tube rolls out of the hooks and falls onto an inclined feed table formed by a pair of arms 104 adjustably carried on a supporting bar 105, which latter is adjustably mounted by a bolt and slot fastening 106 to a fixed support 110 planted on the bed-plate of the machine (see Figs. 27 and 28). The bar 105 is clamped to an inclined face of this fixed support so that the table can be adjusted relatively to the axis of the mandrel C without disturbing its angle of inclination. Immediately in front of the inclined table 104 and supported by it is an intermediate table 140, which is shown as parallel with the mandrel and horizontal but which may be inclined if desired. This table forms a continuation of the inclined table and serves to check the motion of the tube rolling from the latter. The tube deposited on the inclined table 104 and rolling downwardly toward the intermediate table is first caught and stopped by a pair of scape fingers marked 132, and held momentarily by them until the tube carriage B is ready to receive it. These fingers are carried on a rock shaft 131 and are adjustable thereon. The rock shaft is journaled in upright standards on the frame-plates 96 and is actuated through its crank 134 and cam rod 135 from a cam on the upper chain shaft 99. As shown more clearly in Figs. 17 and 19, the cam rod 135 is yoked to the shaft 99, carries a cam roller 138 and is under the tension of a coil spring 139 connected between it and a stud on the bearing of the chain shaft. The forward actuation of the cam rod rocks the shaft 131 in the direction which raises the scape fingers and the spring operates to draw the fingers back to their depressed position. The tube released in this manner rolls over the intermediate table 140 and onto the top of an inclined apron or table 77 which is carried by the tube carriage B. Here it is again stopped by another set of arms or fingers which may be appropriately termed retaining fingers, since they serve to hold the tube on the carriage while the latter is advancing with the tube toward the mandrel.

The mounting of the inclined table 77 includes a plate 78 which is adjustably bolted to a bracket 79 fast on the top of the tube carriage. The latter is mounted in suitable ways formed in the bed-plate of the machine so that it may slide toward and under the mandrel. The tube carriage also has rigidly fastened upon it at its opposite ends, a pair of upright standards 71 and 72. The standard 71 is provided with a forwardly extending arm 74 in which a rod 73 is adjustably bolted, and on the end of this rod there is secured a rearwardly extending plate 75 having a circular aperture therein which is in alinement with the axis of the mandrel. This apertured plate constitutes a pusher for engaging the end of the tube while the latter is held on the table 77 and pushing it upon and over the mandrel. The aperture is provided in it so that it may pass over the end of the mandrel and allow the latter to become seated in a bearing 67 provided for it in the upright 71. The free end of the mandrel, it will be observed, besides being tapered to facilitate the placing of the tube thereon, is also reduced in diameter, as shown at 68 in Fig. 17. This reduced portion fits in the hole or bearing 67 when the carriage is advanced to the end of its traverse toward the mandrel and remains seated and supported therein while the mandrel is revolving and is called upon to resist the pressure exerted by the several cutters. Distortion of the mandrel while in action is thus prevented and greater lengths of mandrels thus rendered permissible with corresponding increase in the efficiency of the machine. The tube held on the carriage table 77 by the fingers 81 is located between the pusher just referred to and a stripper 76 which is formed by a plate fastened to the carriage upright 72 and having a semicircular notch in its rearward extremity, which just fits over the surface of the mandrel. In the return movement of the carriage, this plate operates to push the severed tube sections off the mandrel, as will be readily understood, so that the said sections fall one after the other from the inclined table 77, from whence they roll over the chute G into the receptacle H.

The retaining fingers 81 are carried by a rock-shaft 80 which is journaled in the upper extremities of the tube carriage uprights 71 and 72, and this shaft is adapted to be rocked at the proper moment to swing the said retaining fingers away from the mandrel and tube so that they will not interfere with the cutting and discharging or stripping operations. This rocking movement of the shaft is produced by a pinion 84 fast thereon which meshes with a sliding rack bar 85 mounted in the upright 71. The end of the rack bar rests on a cam 86 pivoted on the upright 71 and provided with a laterally projecting stud 88 and being so arranged that movement of the cam into one position raises the rack bar and thereby rocks the fingers on the shaft 80 away from the tube and mandrel, while movement of the cam to the opposite position allows the rack bar to descend and return the fingers to their former retaining position, the return being preferably produced by a coil spring 82 fastened between the upright 72 and the collar 83 on the said rock shaft. On the bed plate of the machine there are provided two fixed abutment stops 89 and 90. One of them, 89, is located in the position where it will be encountered by the stud of the cam 86 when the carriage reaches its tube-receiving position, thereby bringing the retaining fingers into the position in which they stop and hold the tube in alinement with the mandrel. The other abutment stop, 90, is placed in the path of the stud of the cam 86 just before the carriage reaches the tube-cutting position, and the effect of the engagement of the one with the other operates the rack and rock shaft in the manner just described to turn the fingers away from the shaft, in which position they are held until the reverse operation takes place by reëngagement of the cam with the abutment stop 89.

In addition to the foregoing, the machine illustrated is supplied with an automatic stop motion system designed to stop the machine in the event of failure of a tube to reach the mandrel C from any cause whatever. For this purpose the hand lever U above described and which controls the drive shaft L is jointed to a connecting bar 142 which runs along the front face of the machine frame, being supported at the opposite end upon a supplemental hand lever U′ by which also the machine may be put in motion when desired. The connecting bar 142 is under the influence of a weighted bell crank 146 linked to the bar 142 by link 147, which tends to throw the lever in the direction to unclutch the drive shaft L from the power wheel J. The bell-crank is provided with a beveled lug 150 associated with an electro-magnetic latching device 159 in such a way that when moved to the starting position, the lug catches on the latching device and the bell-crank is thereafter sustained against the weight in its power-on position.

A circuit and source of current such as shown in Fig. 34, are provided for energizing the electro-magnetic device to release the latch and allow the bell-crank to operate bar 142 for unclutching the drive shaft L. This circuit may be closed by a hand switch such as indicated at 169 in Fig. 34, which may be mounted on the machine frame at any desired point or may be duplicated in the obvious way and mounted at several points. The automatic closing of the said circuit in case the mandrel is unsupplied with a tube is effected through the mechanism shown more clearly in Figs. 17, 20, 21 and 21ᵃ. This comprises a support 178 extending horizontally from the frame upright 130 and carrying journal brackets 177 and 179 in which are journaled two bevel geared shafts 176 and 180. The shaft 176 extends forwardly over the mandrel C and carries an arm 175 (see Figs. 21 and 21ᵃ) adjustably bolted to it. The end of this arm carries a roller 152 mounted thereon and electrically insulated therefrom or from the frame of the machine. The roller is connected to one pole of the circuit and is adapted to contact with the mandrel C which is connected through the metal of the frame with the other pole of the circuit. The shaft 180 is normally urged to rock in the direction which swings the contact roller toward the mandrel, by a spring 183 thereon of obvious arrangement. The contact roller is held out of contact with the mandrel during the time in which the tube is being placed thereon and removed therefrom by means of a crank arm 186 on the shaft 180 and a cam rod 187 which connects the crank arm for operation by a cam 189 on the upper chain shaft 99. The cam rod is yoked over the shaft 99 as a support. Once every revolution, and coinciding with the moment when the carriage has completed its tube-placing functions, the cam roller 191 on the cam rod 187 moves into the notch in the cam 189 under the force of the spring, which allows the bevel gear shafts to rotate and swing the contact roller 152 into contact with the tube on the mandrel. If there is no tube on the mandrel, however, the roller will contact with the bare metal and thus complete or close the circuit, energizing the electromagnetic latching device and allowing the weighted bell-crank to stop the machine in the manner above explained.

The details of operation of the electromagnetic latch are shown in Figs. 35 and 36, the latch proper being shown at 167 and normally held against opening by a transversely pivoted trigger 163 turning on an axle 164. This trigger is pressed by a spring 165 in the direction which will remove it from beneath the latch, allowing the latter to open, but the spring is held ineffective by the armature 160 of the magnet while the latter is not energized. It will be plain from the figures referred to that the energization of the magnet will, by releasing the trigger, release the latch and allow the weighted bell-crank to come into action and stop the machine.

With the hopper filled, it will be seen that in the operation of the machine above described, tubes D being kept in orderly parallel arrangement in the hopper, are taken one at a time by the elevator-chain and deposited on the inclined feed table, where they are momentarily held by the scape fingers 132 and then roll slowly over the horizontal intermediate table 140, settling gently upon the carriage table 77, where they are accurately held by the retaining fingers 81. In this position the tube is between the pusher 74 at one end and the stripper 76 at the other. While the elevator-chain proceeds to pick up another tube, the carriage cam *k* starts the movement of the tube-carriage, which slides the tube over the mandrel. The fingers 81 are automatically retracted as the carriage reaches the end of its tube-placing movement and coincidently with their withdrawal the cutter cam 60 advances the several cutter knives toward the mandrel and the cam 27 sets the latter in rotation. The tubes having been cut, the cutter mechanism withdraws and the mandrel stops rotating, whereupon the return movement of the stripper on the carriage pushes the several cut sections off the mandrel and onto the receiving table, the carriage returning to its former position in time to take the next tube from the scape fingers, whereupon the same operation is repeated and so on until the vibrating contact roller 152 finds contact with the bare metal of the mandrel, when the machine is automatically stopped.

Claims:—

1. In a tube cutting machine, the combination of an intermittently revoluble mandrel, a reciprocating carriage, and friction brake means for cushioning the movement of the carriage rendered operative at each end of its stroke.

2. In a tube cutting machine, the combination of an intermittently revoluble mandrel, a reciprocating carriage, driving means, and elastically extensible connections between said driving means and the connections for the carriage.

3. In a tube cutting machine, the combination of a carriage and a mandrel arranged longitudinally substantially in line with each other, means for reciprocating one relatively to the other, means for intermittently rotating the mandrel, cutter knives, means for actuating the same, feeding mechanism for feeding tubes to the carriage, and means for cushioning the movement of the carriage at each end of its stroke.

4. In a tube cutting machine, the combination of an intermittently revoluble mandrel, a reciprocating carriage, a pusher and a stripper for pushing a tube over the mandrel and for stripping the tube from the mandrel, means for feeding tubes to the carriage, means for cutting the tubes on the mandrel, and means for cushioning the movement of the carriage at each end of its stroke.

5. In a tube cutting machine, the combination of a longitudinally movable reciprocating carriage and operative mechanism for actuating the same, an intermittently revoluble longitudinally extending mandrel arranged substantially in the line of movement of said carriage, cutter knives mounted adjacent the mandrel, means controlled by the operative mechanism of the carriage for intermittently rotating the mandrel and for actuating the cutter knives while the mandrel is revolving, feeding mechanism for feeding tubes to be cut to said carriage, and means for cushioning the movement of the carriage at each end of its stroke.

6. In a tube cutting machine, the combination of a longitudinally movable reciprocating carriage and operative mechanism for actuating the same, an intermittently revoluble longitudinally extending mandrel arranged substantially in the line of movement of said carriage, cutter knives mounted adjacent the mandrel, means controlled by the operative mechanism of the carriage for intermittently rotating the mandrel and for actuating the cutter knives while the mandrel is revolving, a pusher and a stripper carried by said carriage, feeding mechanism for feeding tubes to be cut to said carriage between the pusher and stripper, whereby a tube is pushed over the mandrel, and removed therefrom by the stripper after being cut into lengths, and means for cushioning the movement of the carriage at each end of its stroke.

7. In a tube cutting machine, the combination of an intermittently revoluble mandrel, a reciprocating carriage, means for cushioning the movement of the carriage at each end of its stroke, driving means for the carriage, and elastically extensible connections between said driving means and the carriage connections.

8. In a tube cutting machine, the combination of an intermittently revoluble mandrel, a reciprocating carriage, driving connections therefor, and elastic means for permitting lost motion in said connections.

9. In a tube cutting machine, the combination of an intermittently revoluble mandrel, a reciprocating carriage, driving connections therefor, elastic means for permitting lost motion in said connections, and friction brake means for cushioning the movement of the carriage rendered operative at each end of its stroke.

10. In a tube cutting machine, the combination of a carriage and a mandrel arranged longitudinally substantially in line with each other, means for reciprocating one relatively to the other, means for intermittently rotating the mandrel, cutter knives and means for actuating the same, feeding mechanism for feeding tubes to the carriage, driving connections for said carriage, and elastic means for permitting lost motion in said connections.

11. In a tube cutting machine, the combination of an intermittently revoluble mandrel, a reciprocating carriage, a pusher and a stripper for pushing a tube over the mandrel and for stripping the tube from the mandrel, means for feeding tubes to the carriage, means for cutting the tubes on the mandrel, driving connections for said carriage, and elastic means for permitting lost motion in said connections.

12. In a tube cutting machine, the combination of a longitudinally movable reciprocating carriage and operative mechanism for actuating the same, an intermittently revoluble longitudinally extending mandrel arranged substantially in the line of movement of said carriage, cutter knives mounted adjacent the mandrel, means controlled by the operative mechanism of the carriage for intermittently rotating the mandrel and for actuating the cutter knives while the mandrel is revolving, feeding mechanism for feeding tubes to be cut to said carriage, and elastic means for permitting lost motion in the actuating mechanism for the carriage.

13. In a tube cutting machine, the combination of a longitudinally movable reciprocating carriage and operative mechanism for actuating the same, an intermittently revoluble longitudinally extending mandrel arranged substantially in the line of movement of said carriage, cutter knives mounted adjacent the mandrel, means controlled by the operative mechanism of the carriage for intermittently rotating the mandrel and for actuating the cutter knives while the mandrel is revolving, a pusher and a stripper carried by said carriage, feeding mechanism for feeding tubes to be cut to said carriage between the pusher and stripper, whereby a tube is pushed over the mandrel and removed therefrom by the stripper after being cut into lengths, and elastic means for permitting lost motion in the actuating mechanism for the carriage.

14. In a tube cutting machine, the combination of a carriage and a mandrel arranged longitudinally substantially in line with each other, means for reciprocating one relatively to the other, means for intermittently rotating the mandrel cutter knives and means for actuating the same, feeding mechanism for feeding tubes to the carriage, driving connections for said carriage, elastic means for permitting lost motion in said connections, and means for cushioning the movement of the carriage at each end of its stroke.

15. In a tube cutting machine, the combination of an intermittently revoluble mandrel, a reciprocating carriage, a pusher and a stripper for pushing a tube over the mandrel and for stripping the tube from the mandrel, means for feeding tubes to the carriage, means for cutting the tubes on the mandrel, driving connections for said carriage, elastic means for permitting lost motion in said connections, and means for cushioning the movement of the carriage at each end of its stroke.

16. In a tube cutting machine, the combination of a longitudinally movable reciprocating carriage and operative mechanism for actuating the same, an intermittently revoluble longitudinally extending mandrel arranged substantially in the line of movement of said carriage, cutter knives mounted adjacent the mandrel, means controlled by the operative mechanism of the carriage for intermittently rotating the mandrel and for actuating the cutter knives while the mandrel is revolving, feeding mechanism for feeding tubes to be cut to said carriage, elastic means for permitting lost motion in the actuating mechanism for the carriage, and means for cushioning the movement of the carriage at each end of its stroke.

17. In a tube cutting machine, the combination of a longitudinally movable reciprocating carriage and operative mechanism for actuating the same, an intermittently revoluble longitudinally extending mandrel arranged substantially in the line of movement of said carriage, cutter knives mounted adjacent the mandrel, means controlled by the operative mechanism of the carriage for intermittently rotating the mandrel and for actuating the cutter knives while the mandrel is revolving, a pusher and a stripper carried by said carriage, feeding mechanism for feeding tubes to be cut to said carriage between the pusher and stripper, whereby a tube is pushed over the mandrel and removed therefrom by the stripper after being cut into lengths, elastic means for permitting lost motion in the actuating mechanism for the carriage, and means for cushioning the movement of the carriage at each end of its stroke.

18. In a tube cutting machine, the combination of a longitudinally movable carriage having a rack, a toothed segment coöperating with said rack for reciprocating said carriage, connections for actuating said segment, an intermittently revoluble mandrel arranged substantially in line with said carriage, means controlled by the actuating connections for the rack for controlling the intermittent rotation of the mandrel, cutter knives arranged adjacent the mandrel, means for actuating said knives, feeding mechanism for feeding tubes to said carriage, and means for cushioning the shock at each end of the stroke of the segment.

19. In a tube cutting machine, the combination of a longitudinally movable carriage having a rack, a toothed segment coöperating with said rack for reciprocating said carriage, connections for actuating said segment, an intermittently revoluble mandrel arranged substantially in line with said carriage, means controlled by the actuating connections for the rack for controlling the intermittent rotation of the mandrel, cutter knives arranged adjacent the mandrel, means for actuating said knives, feeding mechanism for feeding tubes to said carriage, and frictional means for cushioning the shock at each end of the stroke of the segment.

20. In a tube cutting machine, the combination of a longitudinally movable carriage having a rack, a toothed segment coöperating with said rack for reciprocating said carriage, elastic connections for actuating said segment, an intermittently revoluble mandrel arranged substantially in line with said carriage, means controlled by the actuating connections for the rack for controlling the intermittent rotation of the mandrel, cutter knives arranged adjacent the mandrel, means for actuating said knives, and feeding mechanism for feeding tubes to said carriage.

21. In a tube cutting machine, the combination of a longitudinally movable carriage having a rack, a toothed segment coöperating with said rack for reciprocating said carriage, elastic connections for actuating said segment, an intermittently revoluble mandrel arranged substantially in line with said carriage, means controlled by the actuating connections for the rack for controlling the intermittent rotation of the mandrel, cutter knives arranged adjacent the mandrel, means for actuating said knives, feeding mechanism for feeding tubes to said carriage, and means for cushioning the shock at each end of the stroke of the segment.

22. In a tube cutting machine, the combination of a longitudinally movable carriage having a rack, a toothed segment coöperating with said rack for reciprocating said carriage, elastic connections for actuating said segment, an intermittently revoluble mandrel arranged substantially in line with said carriage, means controlled by the actuating connections for the rack for controlling the intermittent rotation of the mandrel, cutter knives arranged adjacent the mandrel, means for actuating said knives, feeding mechanism for feeding tubes to said carriage, and frictional means for cushioning the shock at each end of the stroke of the segment.

23. In a tube cutting machine, the combination of a reciprocating carriage, an intermittently revoluble mandrel, means for actuating the carriage, means controlled thereby for actuating the mandrel, cutter knives and means for actuating the same, means for feeding tubes to the carriage, and automatic means for stopping the machine in case a tube fails to pass onto the mandrel.

24. In a tube cutting machine, the combination of a reciprocating carriage, and an intermittently revoluble mandrel, arranged substantially in line with each other, a pusher and a stripper on said carriage, means for feeding tubes to said carriage between said pusher and stripper, and means for automatically stopping the carriage in case a tube fails to pass over the mandrel.

25. In a tube cutting machine, the combination of a mandrel, knives, means for moving the knives relatively to the mandrel and into tube cutting engagement therewith, reciprocating means for placing a tube on the mandrel and a device for cushioning the shock at each end of the stroke of said means.

26. In a tube cutting machine, the combination with a mandrel, of a carriage for placing a tube to be cut on the mandrel, and for removing the sections of the cut tube therefrom, means for reciprocating the carriage, a clutch controlled mechanism for intermittently rotating the mandrel, a clutch and means controlled by the operating mechanism of the carriage for periodically rendering the clutch operative.

27. In a tube cutting machine, the combination with a mandrel, of a device for feeding tubes thereto, knives, means for moving the knives relatively to the mandrel and into tube cutting engagement therewith, means for actuating said device and said knives, clutch controlled means for intermittently rotating the mandrel, a clutch, and means controlled by the actuating means for periodically rendering the clutch operative.

28. In a tube cutting machine, a mandrel, mechanisms for placing a tube on the mandrel and for stripping the cut tube sections therefrom, driving means for said mechanism and an elastic connection between said means and said mechanism.

29. In a tube cutting machine, a mandrel, a carriage, comprising means for inserting tubes to be cut on the mandrel, and for stripping the cut tube sections therefrom, means for reciprocating the carriage, an extensible connection between said means and the carriage, and means for cushioning the movement of the carriage at each end of its stroke.

30. In a tube cutting machine, a mandrel, a tube-containing hopper, means for feeding and delivering tubes from the hopper to the mandrel and means actuated thereby and distinct from the tube feeding devices for maintaining the tubes in the hopper in parallel relation.

31. In a tube cutting machine, a mandrel, a carriage for inserting tubes on the mandrel and for stripping cut tube sections therefrom, fingers mounted on the carriage, for alining the tube with the mandrel prior to inserting it thereon, and means actuated by the movement of the carriage for actuating the fingers.

32. In a tube-cutting machine, a mandrel, means for feeding tubes to the mandrel, knives, means for moving the knives relatively to the mandrel and into tube cutting engagement therewith, and means for automatically stopping the machine, in case a tube fails to be received by the mandrel.

33. In a tube cutting machine, a mandrel, means for feeding tubes to the mandrel, knives, means for moving the knives relatively to the mandrel and into tube-cutting engagement therewith, a stop mechanism for automatically stopping the machine, and electrical means for actuating said stop mechanism on the failure of the mandrel to receive a tube.

34. In a tube cutting machine, a mandrel, means for feeding tubes to the mandrel, knives, means for moving the knives relatively to the mandrel and into tube-cutting engagement therewith, a stop mechanism for automatically stopping the machine and means actuated by the tube feeding means for controlling the operation of the mechanism.

35. In a tube cutting machine, a mandrel, means for feeding tubes to the mandrel, knives, means for moving the knives relatively to the mandrel and into tube-cutting engagement therewith, a stop mechanism for automatically stopping the machine, an electrical means, for controlling the operation of said mechanism, and a circuit including said mandrel for rendering the electrical means operative.

36. In a tube cutting machine, a mandrel, a removable and adjustable sleeve therefor, said sleeve having normally longitudinally uninterrupted surface, knives to operate against said surface, and means for bringing the knives into tube-cutting engagement therewith.

In testimony whereof, we have signed this specification in the presence of two witnesses.

ABNER M. SEELEY.
AUGUST HUETHER.

Witnesses:
H. G. KIMBALL,
CLIFFORD H. KLOS.